(12) United States Patent
Ohguchi et al.

(10) Patent No.: US 8,253,634 B2
(45) Date of Patent: Aug. 28, 2012

(54) RADIO APPARATUS

(75) Inventors: Shuhei Ohguchi, Osaka (JP); Hiroyuki Takebe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 351 days.

(21) Appl. No.: 12/677,493

(22) PCT Filed: Jul. 9, 2009

(86) PCT No.: PCT/JP2009/062510
§ 371 (c)(1),
(2), (4) Date: Mar. 10, 2010

(87) PCT Pub. No.: WO2010/007931
PCT Pub. Date: Jan. 21, 2010

(65) Prior Publication Data
US 2010/0328166 A1 Dec. 30, 2010

(30) Foreign Application Priority Data
Jul. 15, 2008 (JP) .................................. 2008-183924

(51) Int. Cl.
*H01Q 1/24* (2006.01)
(52) U.S. Cl. ..................... 343/702; 343/846; 343/876
(58) Field of Classification Search ............. 343/702, 343/846, 876; 455/575.1, 575.3, 575.4, 575.7
See application file for complete search history.

(56) References Cited

U.S. PATENT DOCUMENTS

| | | | | |
|---|---|---|---|---|
| 7,609,212 B2 * | 10/2009 | Sato et al. | ...................... | 343/702 |
| 7,653,421 B2 * | 1/2010 | Suzuki et al. | ............... | 455/575.3 |
| 7,659,855 B2 * | 2/2010 | Mashima et al. | ............. | 343/702 |
| 2002/0169010 A1 | 11/2002 | Shoji et al. | | |
| 2004/0067783 A1 | 4/2004 | Lenchik et al. | | |
| 2005/0239519 A1 | 10/2005 | Saitou et al. | | |
| 2009/0033566 A1 * | 2/2009 | Nakanishi et al. | ............. | 343/702 |
| 2009/0101405 A1 | 4/2009 | Kawai et al. | | |
| 2009/0131129 A1 | 5/2009 | Yamazaki et al. | | |

FOREIGN PATENT DOCUMENTS

| | | |
|---|---|---|
| EP | 2 023 437 A1 | 2/2009 |
| JP | 11-98049 A | 4/1999 |
| JP | 2003-60759 A | 2/2003 |
| JP | 2003-532351 A | 10/2003 |
| JP | 3613526 B2 | 1/2005 |

(Continued)

*Primary Examiner* — Hoang V Nguyen
(74) *Attorney, Agent, or Firm* — Birch, Stewart, Kolasch & Birch, LLP

(57) ABSTRACT

In a portable telephone, a first housing and a second housing are connected to each other by hinge sections which makes the first housing and the second housing rotatable about the long-side direction of the housings. A metal frame is provided at a peripheral section of the first housing, and a display section is provided at the central section of the first housing. A metal is used as a frame and can also be operated as an antenna element. In the second housing, a circuit board to which a baseband circuit and a radio circuit are mounted, a first feeding section which supplies electric power to the metal frame, and a draw-out rod antenna which can be drawn out from and housed in the housing are supplied with electric power by the second feeding section. Further, a cellular antenna which performs communication with a base station is also incorporated in the second housing. The rod antenna can be drawn out in the direction substantially in parallel with the rotation axis of the above described hinge.

20 Claims, 8 Drawing Sheets

FOREIGN PATENT DOCUMENTS

| | | |
|---|---|---|
| JP | 2005-159391 A | 6/2005 |
| JP | 3830773 B2 | 10/2006 |
| JP | 2007-122195 A | 5/2007 |
| WO | WO-2006/046714 A1 | 5/2006 |
| WO | WO-2007/138682 A1 | 12/2007 |

* cited by examiner

RADIO APPARATUS

BACKGROUND ART

In recent years, portable radio apparatuses have become widely used. In the portable radio apparatus, since importance has been attached to portability and since communication quality has also been required to be improved, the design of antenna elements has become important.

A foldable portable telephone described in Patent Document 1 as will be described below proposes a technique in which, by supplying electric power to a shield case provided in at least one of the housings of the portable telephone, the housing is made to operate as an antenna so as to reduce gain change depending on the state of a user's hand holding the portable telephone. Further, a configuration in which a rod antenna is jointly used is also proposed. For example, in the foldable (clamshell) portable telephone disclosed in Patent Document 1 as will be described below, a rod antenna is provided in a lower case (housing), and the proximal end section (feeding section) of the rod antenna is connected to an output terminal of a transmission circuit. In this technique, the shield box provided in the lower case (housing) is used as an antenna and the rod antenna is also used. This makes it possible to obtain a high gain and to reduce the gain change depending on the state of the hand of the user of the portable telephone.

Patent Document 1: JP Patent No. 3830773 (see in particular FIG. 5 and FIG. 13, and the related description in the specification)

DISCLOSURE OF THE INVENTION

Problems to be Solved by the Invention

However, in the conventional vertically openable clamshell terminal as disclosed in above described Patent Document 1, there is a problem that when the antenna excited by supplying electric power to the shield case in one of the housings as well as the rod antenna having the feeding section at the long-side direction end section of the housing are both used at the same time, the currents are made to flow in the same direction through the ground conductor (ground layer housed in the lower case 34 in Patent Document 1) to be operated as a dipole antenna, and thereby the directivities of both the antennas are made similar to each other.

An object of the present invention is to provide a radio apparatus in which in the case where the radio apparatus includes two antenna elements that are respectively arranged at different housings and that are used in the same frequency band, the directivities of the two antennas are made substantially orthogonal to each other.

Means for Solving the Problems

In order to solve the above described problem, a laterally long-shaped clamshell terminal according to the present invention, which has a first and second housings each having a long-side direction length of about λ/4 or shorter than λ/4 of the use frequency, and which has a hinge section that connects the first housing to the second housing rotatably about the long-side direction of the housings, is featured by including: a first antenna element which is provided at the first housing; a second antenna element which is provided near one of the long-side direction ends in the second housing; a circuit board which has a ground pattern and which is provided in the second housing; and a first and second feeding sections which are connected to a radio circuit on the circuit board.

According to the present invention, there is provided a radio apparatus featured by including: a first housing; a first antenna element which is provided at the first housing; a second housing; a second antenna element which is provided at the second housing; a connecting section which connects the first housing and the second housing to each other; first and second circuit boards which are respectively provided in the first and second housings and each of which has a ground pattern; and first and second feeding sections which are connected to at least one radio circuit provided on at least one of the first and second circuit boards, and featured in that the first antenna element is electrically connected to the first feeding section via the connecting section, in that the long-side direction length of the first and second housings is about λ/4 or shorter than λ/4 of the use frequency of the first and second antennas, in that the second antenna element is provided at a long-side direction end section of the second housing, and in that the first antenna element and the second antenna element are used in the same frequency band. It is preferred that at least one of the first antenna element and the second antenna element, and the ground pattern on the circuit board can be operated as a dipole antenna.

Further, according to the present invention, there is provided a radio apparatus featured by including: a first housing; a first antenna element which is provided at the first housing; a second housing; a second antenna element which is provided at the second housing; a connecting section which connects a long side of the first housing to a long side of the second housing; a circuit board which is provided in the second housing and which has a ground pattern; a radio circuit which is provided in the circuit board; a first feeding section which is connected to the radio circuit and which supplies electric power to the first antenna element via the connecting section; and a second feeding section which is connected to the radio circuit and which supplies electric power to the second antenna element, and featured in that the long-side direction length of the first housing and the second housing is about λ/4 or shorter than λ/4 of the use frequency of the first antenna and the second antenna, in that the second antenna element is provided at a long-side direction end section of the second housing, and in that the first antenna element and the second antenna element are operated in the same frequency band.

Note that when the use frequency is set as f, and when the velocity of light is set as c, λ can be obtained as λ=c/f. It is preferred that the second antenna element is electrically connected to the second feeding section and is extended in the direction substantially orthogonal to the direction of rotation of the hinge. The second antenna element may be a rod antenna which can be drawn out from the housing or which can be folded.

Advantages of the Invention

According to the present invention configured as described above, in the state where the first housing and the second housing are opened, current components flowing through the ground conductors which respectively form dipole antennas in both the antennas are substantially orthogonal to each other, and hence the directivities of the two antennas are also substantially orthogonal to each other on the surface formed by both the housings. Therefore, a substantially non-directional antenna characteristic can be obtained in the horizontal plane at the time of browsing at the terminal when the XY plane of the terminal is set substantially in parallel with the

DESCRIPTION OF SYMBOLS

10 . . . Portable telephone (radio apparatus), 11 . . . First housing, 12 . . . Second housing, 13a, 13b . . . Hinge section, 14 . . . Metal frame (conductive frame), 15 . . . Display section, 16 . . . . Circuit board, 17 . . . First feeding section, 18 . . . Draw-out rod antenna, 19 . . . Second feeding section, 20 . . . Key section (input section), 21 . . . Cellular antenna, 22 . . . Flexible ground conductor, 22a . . . Flexible cable, 23 . . . Conductive hinge, 26 . . . Impedance variable section, 28 . . . Second built-in antenna, 34 . . . Capacitive element.

BEST MODE FOR CARRYING OUT THE INVENTION

In the following, radio apparatuses according to respective embodiments of the present invention will be described with reference to the accompanying drawings. Note that in the following, a portable telephone will be described as an example of the radio apparatuses, but radio apparatuses, such as the other portable terminal and stationary radio apparatus, are also included in the scope of the present invention.

First Embodiment

Figure 1:
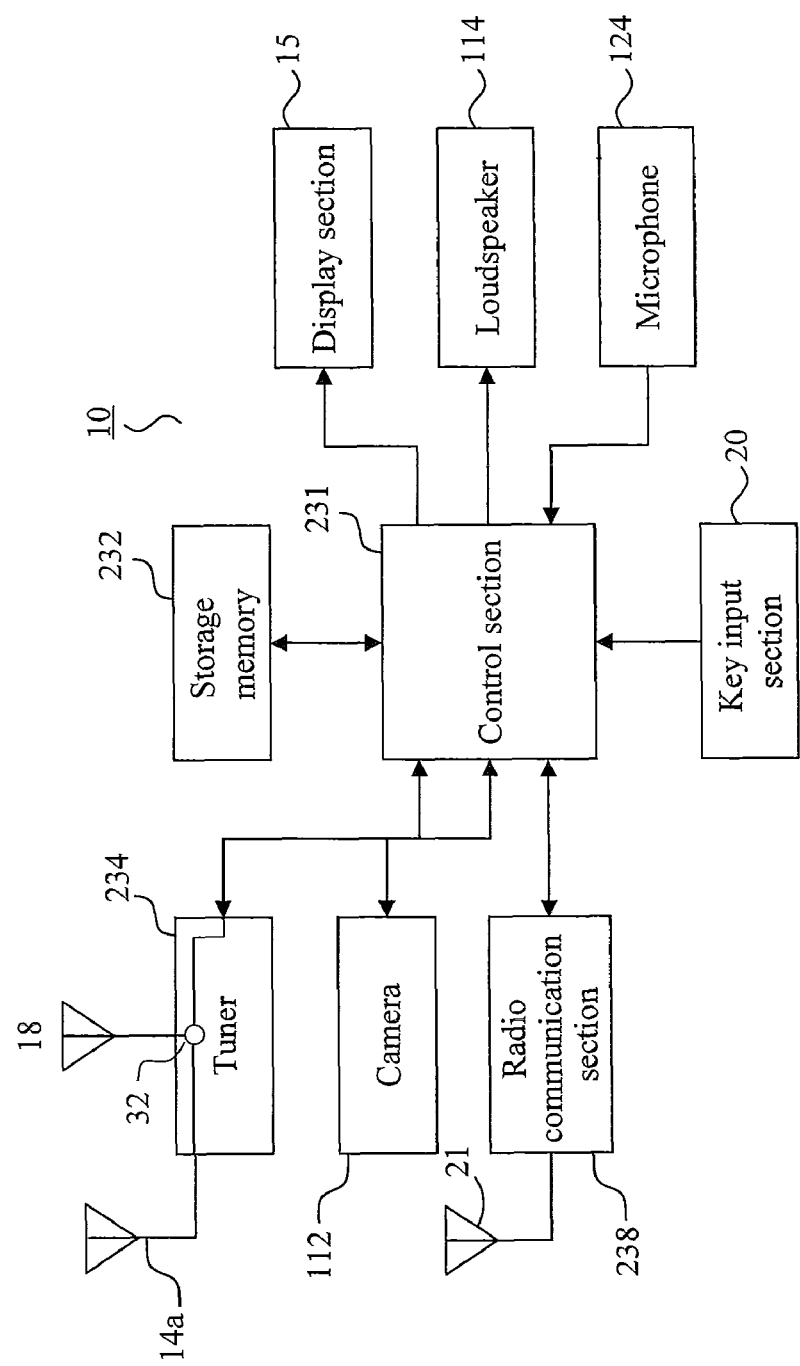
FIG. 1 is a functional block diagram showing a configuration example of a portable telephone according to an embodiment of the present invention.

FIG. 1 is a functional block diagram showing a configuration example of a portable telephone according to an embodiment of the present invention. As shown in FIG. 1, a portable telephone 10 includes a radio communication section 238, a cellular antenna 21 for radio communication, a camera 112, a key input section 20, a display section 15, a loudspeaker 114, a microphone 124, a control section 231, a storage memory 232, a tuner 234, such as a one-segment tuner, and a housing antenna 14a and a rod antenna 18 which are used for the tuner 234. The portable telephone 10 may have the other functions. Note that reception signals from the housing antenna 14a and the rod antenna 18 are inputted into the tuner 234, but it is also possible to configure such that a selector switch SW 32 is provided to allow only one of the reception signals to be taken into the tuner 234.

Figure 2:
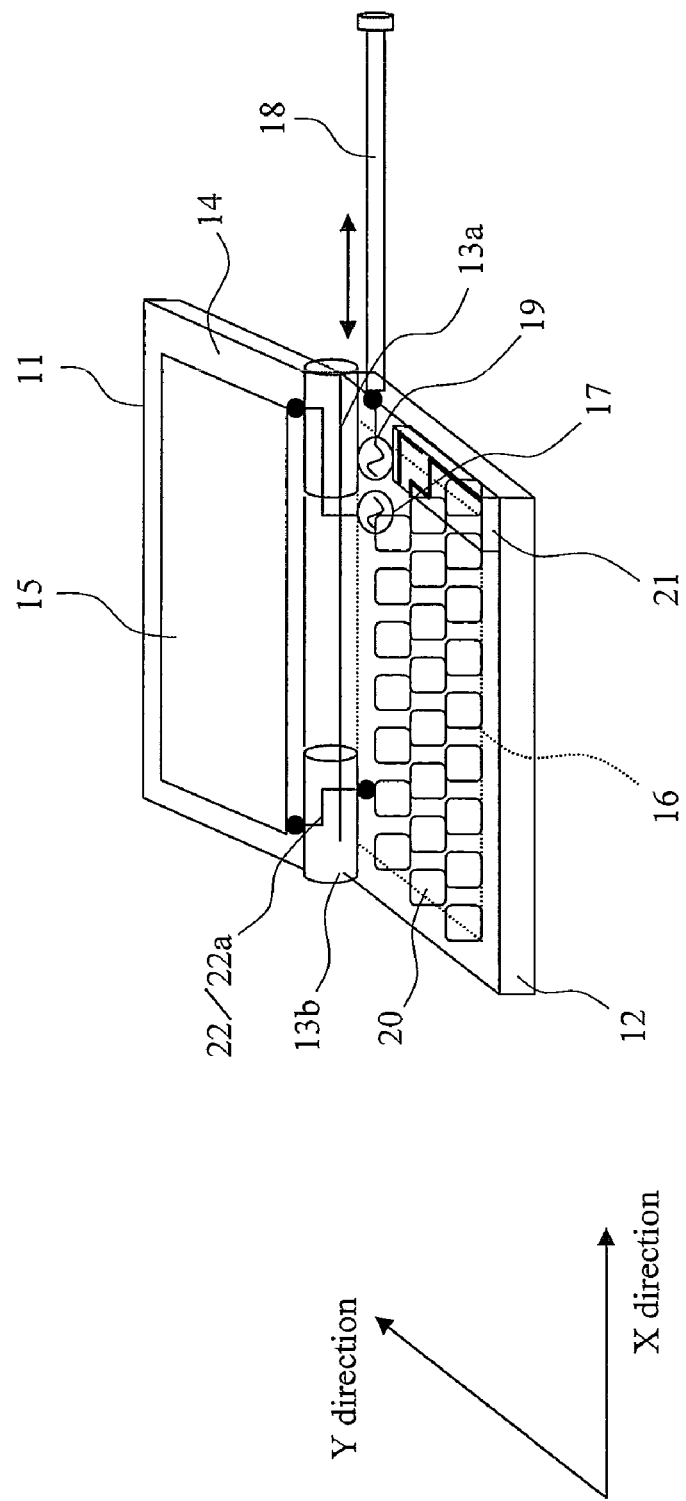
FIG. 2 is a schematic view showing an external configuration example of the portable telephone according to the first embodiment of the present invention.

FIG. 2 is a schematic view showing an external configuration example of the portable telephone (radio apparatus) according to the first embodiment of the present invention. As shown in FIG. 2, the portable telephone 10 is configured by connecting a first housing 11 to a second housing 12 by hinge sections 13a and 13b (connecting sections) which connect the housings 11 and 12 to each other rotatably about the housing long-side direction. A metal frame 14 (conductive frame: first antenna) is provided at the peripheral portion of the first housing 11, and the display section 15 is provided at the central portion of the first housing 11. A metal, such as, for example, a magnesium alloy and SUS, which is highly conductive, light in weight, and high in mechanical strength, is used for the metal frame 14. By using such metal, it is possible that the mechanical strength is secured even in a thin shape, and that the metal frame 14 is arranged fully across the housing so as to operate as the first antenna element.

On the other hand, a circuit board 16 to which a baseband circuit, a radio circuit, and the like, are mounted, and a first feeding section 17 which supplies electric power to the metal frame 14 are provided in the second housing 12. Further, in the second housing 12, electric power is supplied by a second feeding section 19 to the draw-out rod antenna 18 which can be drawn out from or housed in the housing, and further the key section (input section) 20 which performs input operations of a telephone number, characters, and the like, is provided. Further, the cellular antenna 21 which performs communication with a base station is also incorporated in the second housing 12. The rod antenna 18 is configured so as to be able to be drawn out in the direction substantially in parallel with the axis of rotation of the hinge.

The ground in the first housing 11 and the ground of the circuit board 16 are connected to each other by a flexible ground conductor 22 via the hinge section 13b at the housing end side opposite to the first feeding section 17 and the second feeding section 19 in the direction of the X-axis (see FIG. 2). That is, the first feeding section 17 and the second feeding section 19 are provided at the same end side in the second housing 12 in the extending direction of the hinge section 13a and the hinge section 13b, while the connection point of the ground of the circuit board 16 and the flexible ground conductor 22 is provided at the opposite side end.

A flexible cable 22a in which various cables are bundled is provided along with the flexible ground conductor 22. The flexible cable 22a is a cable which electrically connects an electronic circuit (provided on a circuit board (not shown)) provided in the first housing 11 to an electronic circuit (usually provided on the circuit board 16) provided in the second housing 12. Note that the ground (ground pattern) is provided on substantially the whole rear surface of the circuit board 16.

Figure 3:
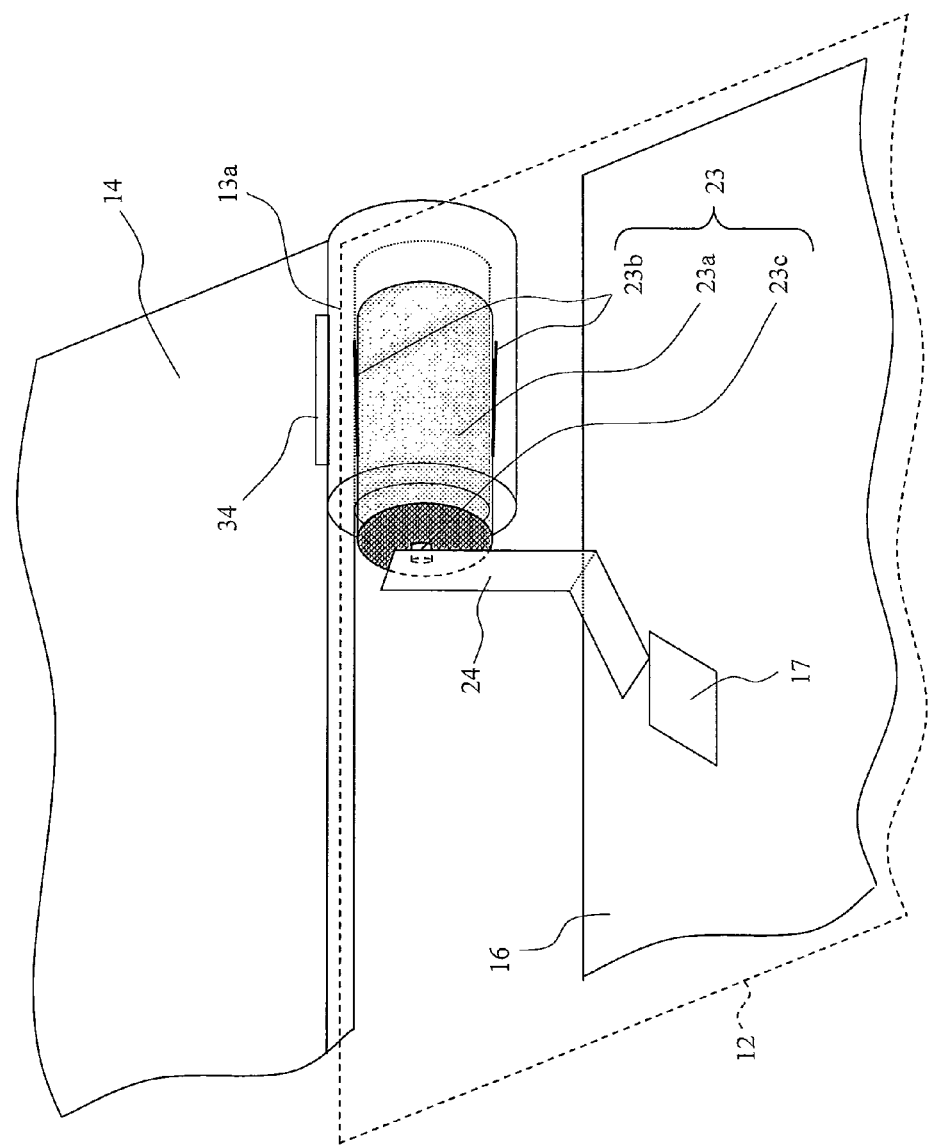
FIG. 3 is a view showing an example of a method of connecting a first feeding section 17 to a metal frame 14 in FIG. 2.

FIG. 3 is a view showing an example of a method of connecting the first feeding section 17 to the metal frame 14. The metal frame 14 and the cylindrical hinge section 13a are formed into a shape integrally molded with a magnesium alloy. A conductive hinge 23 is incorporated in the cylindrical hinge section 13a. The conductive hinge 23 mainly has three sections each of which is partially or entirely made of a conductive metal, and which are a cylindrical conductive hinge main body section 23a, a conductive hinge section spring section 23b that is arranged at the outer periphery of the cylindrical conductive hinge main body section 23a so as to be in contact with the cylindrical hinge section 13a, and a conductive hinge projecting section 23c that is provided on the one side surface of the cylindrical conductive hinge main body section 23a. As described above, the inner wall of the hinge section 13a and the conductive hinge spring section 23b are brought into contact with each other by a suitable contact pressure, so as to be electrically conductive to each other. The conductive hinge projecting section 23c is connected with a suitable contact pressure to a spring-like sheet metal 24 provided between the conductive hinge projecting section 23c and the first feeding section 17, and is connected to the first feeding section 17 via the spring-like sheet metal 24. The first antenna element (metal frame 14) is DC connected by the spring-like sheet metal 24 via the second housing 12, the first feeding section 17, the spring-like sheet metal 24, and the conductive hinge 23 so as to be supplied with electric power.

Note that it may also be configured such that, for example, a capacitor structure of metal-insulator (or hollow body)-metal is formed on the outer peripheral side surface of the hinge section 13a so as to be brought into contact with the metal frame 14 of the first housing 11. The antenna characteristic can be adjusted by adopting such structure.

Further, on the circuit board 16, the first feeding section 17 and the second feeding section 19 are connected to the tuner section 234 via a matching circuit (not shown). At this time, it is preferred that an impedance circuit such as, for example, a filter, which is suitable for the use frequency band of the cellular antenna 21, is mounted in the matching circuit connected to the first feeding section 17.

The present embodiment will be described by using, as an example, the case where the first antenna element 14 and the second antenna element 18 are used as antennas for receiving one-segment broadcasting in the same frequency band. Here, the same frequency band means a frequency band having a fixed band width in which a plurality of channels used by the same communication system and method are collected.

The frequency band for one-segment broadcasting, which is currently used in Japan, is 470 MHz to 770 MHz. Thus, the wavelength $\lambda$ is about 638.3 mm at 470 MHz, and is about 389.6 mm at 770 MHz. Further, one fourth of the wavelength ($\lambda/4$) is about 159.6 mm at 470 MHz, and is about 97.4 mm at 770 MHz.

The housing length of a common clamshell portable telephone terminal in its longitudinal X direction is set to a value from 80 mm to at most about 120 mm, which value is very close to or slightly shorter than one fourth ($\lambda/4$) of the wavelength of the UHF band used in one-segment broadcasting. In the present embodiment, it is assumed, for example, that the housing length in the X direction is 120 mm and that the housing length in the Y direction is 50 mm.

(1) When electric power is supplied to the metal frame 14 from the first feeding section 17, current is made to flow mainly in the Y direction on the metal frame 14 and the ground of the circuit board 16, so that the metal frame 14 and the ground of the circuit board 16 operate as a dipole antenna (hereinafter described as "first antenna").

(2) Further, when the X-axis direction length and the Y-axis direction length of the circuit board 16 are compared with each other, the X-axis direction length is closer to $\lambda/4$ of the use frequency. Thus, when the rod antenna 18 is drawn out in the X direction, current is made to flow mainly in the X direction on the rod antenna 18 and the ground of the circuit board 16, so that the rod antenna 18 and the ground of the circuit board 16 operate as a dipole antenna (hereinafter described as "second antenna").

Figure 4:
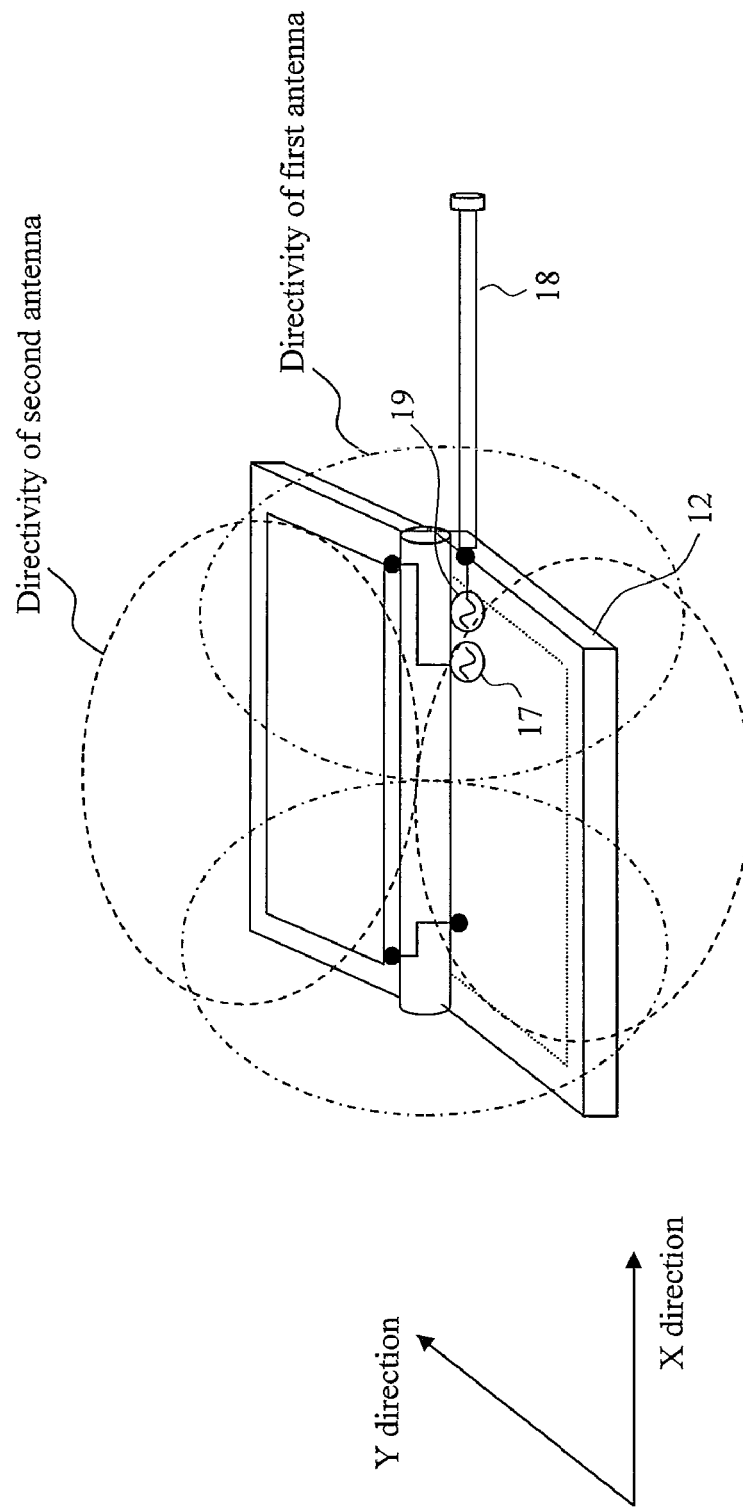
FIG. 4 is a view showing the directivity of a first antenna and the directivity of a second antenna.

(3) FIG. 4 is a view showing the directivity of the first antenna and the directivity of the second antenna. The current component flowing in the Y-axis direction on the metal frame 14 and the ground surface of the circuit board 16 acts as a dipole antenna, and hence the directivity of the first antenna is an 8-shaped directivity in which the Y-axis direction is set to null with respect to the horizontal plane. Further, the current component flowing in the X-axis direction on the second antenna element 18 and the ground surface of the circuit board 16 acts as a dipole antenna, and hence the directivity of the second antenna is an 8-shaped directivity in which the X-axis direction is set to null with respect to the horizontal plane.

Therefore, the directivity of the first antenna is effective to reduce the amount of deterioration in the radio wave in the case where both the ends of the second housing 12 are held by hands, such as the case where browsing is performed using the terminal in the state in which the terminal is held substantially in parallel with the horizontal ground surface, because the amount of radio wave emitted in the direction of the human body present in the −Y-axis direction is small in such case.

Note that the housing length close to $\lambda/4$ is most effective because the directivity becomes close to the 8-shaped directivity at the time when the housing length is set close to $\lambda/4$.

Since the directivity of the first antenna and the directivity of the second antenna are orthogonal to each other, the antenna characteristics of the antennas are not substantially adversely affected by each other. When the directivity of the first antenna and the directivity of the second antenna are added to each other, it is possible to obtain a high gain antenna characteristic which is substantially non-directional (nearly circular) with respect to the XY plane. Thus, it is possible to obtain extremely excellent antenna characteristics in comparison with the time when the antennas are used, as a single antenna serving as a diversity antenna, in such a manner that the use of the antennas is switched by a switch.

In the one-segment broadcasting in Japan, the base stations, which perform transmission by horizontally polarized waves, occupy the majority, and hence the above described directivity is very advantageous in the state of browsing at the terminal, or the like, in which state the XY plane of the terminal is held substantially in parallel with the horizontal ground surface.

Note that in the first embodiment, the metal frame 14 and the rod antenna 18 are described as antennas for receiving one-segment broadcasting, but the antennas are not limited to the antennas for receiving one-segment broadcasting. The antennas described in the first embodiment may be antennas for receiving other broadcasting, such as full-segment broadcasting, and may also be communication antennas which can be used for transmission or reception. The antenna is particularly effective at the time when the long-side (X-axis) direction length of the housing is close to one fourth of the wavelength ($\lambda/4$) of the use system or shorter than $\lambda/4$.

Further, in the first embodiment, the rod antenna, in which the second antenna element 18 can be drawn out from the second housing 12 in the X direction, is described as an example, but the drawing direction is not limited to this. For example, even in the case where the second antenna element 18 can be drawn out in the Y-axis direction, when the second antenna element 18 is configured to be able to be folded in the X-axis direction, the same effect can be obtained.

Further, in the first embodiment, the configuration, in which the first feeding section 17 and the metal frame 14 are connected by the conductive hinge 23, is described. However, it may also be configured such that the first housing 11 and a metal arranged in the second housing 12 are overlapped with each other in a non-contact manner so that electric power is supplied by the capacitive coupling. Further, the first antenna element is not limited to the metal frame, and electric power may be supplied to a shield case, or the like. Also, in the case where the first antenna element and the hinge section are not integrally molded, the same effect can be obtained.

Further, electric power is supplied to the metal frame 14 and the rod antenna 18 at the same end side in the long-side direction of the second housing 12, but the rod antenna 18 may also be configured so as to be able to be supplied with electric power and drawn out at the opposite end.

Further, the first embodiment is described by using an example in which the antennas are used for diversity, or the like, in the same channel. However, the first embodiment may also be configured so as to perform two channel reception, or the like, by the separate channels in such a manner that the first antenna element and the second antenna element are respectively connected to separate tuners. In this case, even when both the antennas are simultaneously used in the same frequency band, since the directivities of the antennas are orthogonal to each other, the coupling between both the antennas is small, and hence excellent antenna characteristics can be obtained in each of the antennas. Further, the antennas may also be used as antennas for MIMO, and can also be used together with the methods of diversity, two channel reception, or the like.

Second Embodiment

Figure 5:
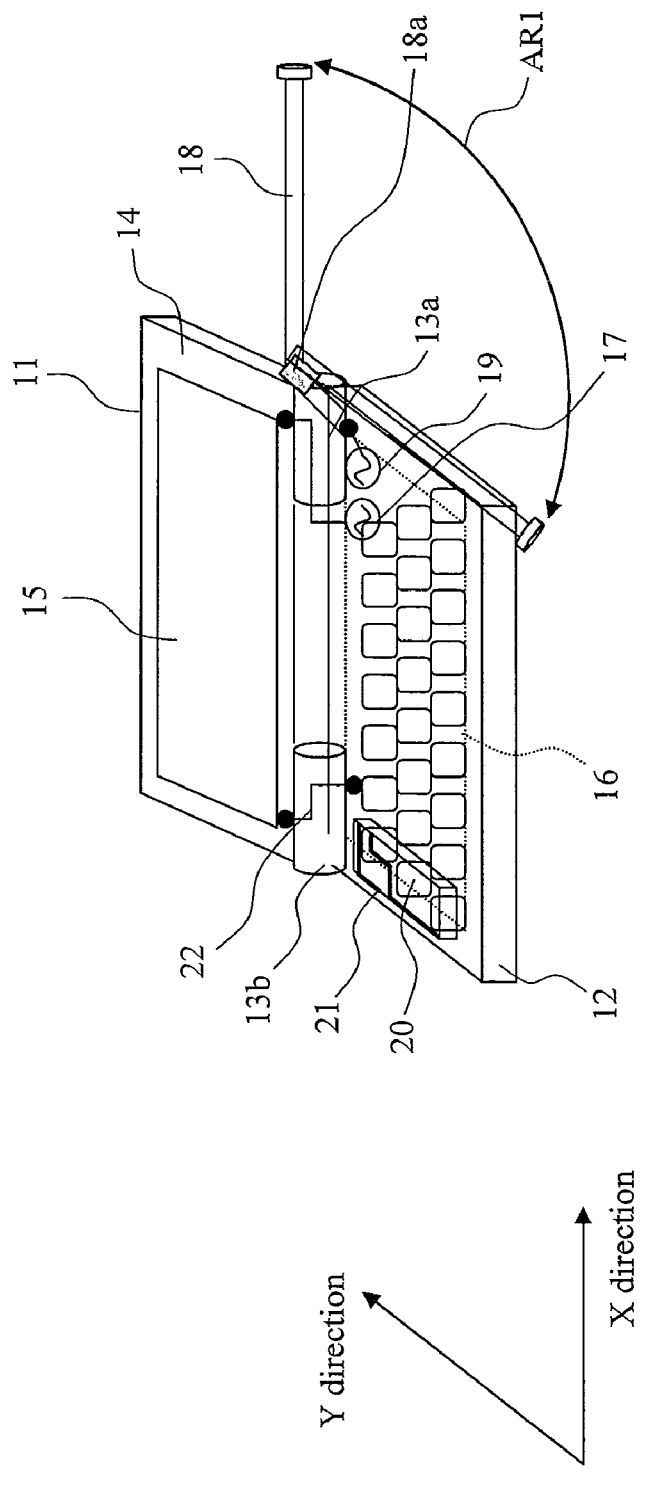
FIG. 5 is a view showing a schematic configuration example of a portable telephone according to a second embodiment of the present invention.

FIG. 5 is a view showing a schematic configuration example of a portable telephone according to a second embodiment of the present invention. Note that in FIG. 5, portions identical with those in FIG. 2 referred to and described in the first embodiment are denoted by the same reference numerals and characters, and the explanation of the portions is omitted.

In FIG. 5, the rod antenna 18 is arranged in the second housing 12 and is configured to be able to be drawn out in the X-axis direction. However, in this case, the rod antenna 18 is configured such that a rod antenna tiltable section 18*a* is provided at the root section of the rod antenna 18, and such that the rod antenna 18 can be folded from the state of extending in the X-axis direction to the state of extending in the Y-axis direction by using the rod antenna tillable section 18*a* as a base. Further, the cellular antenna 21 is arranged at the opposite end of the second housing 12 in the X-axis direction so as to prevent that the cellular antenna 21 and the rod antenna 18 interfere with each other at the time when the rod antenna 18 is housed in the second housing 12.

Figure 6:
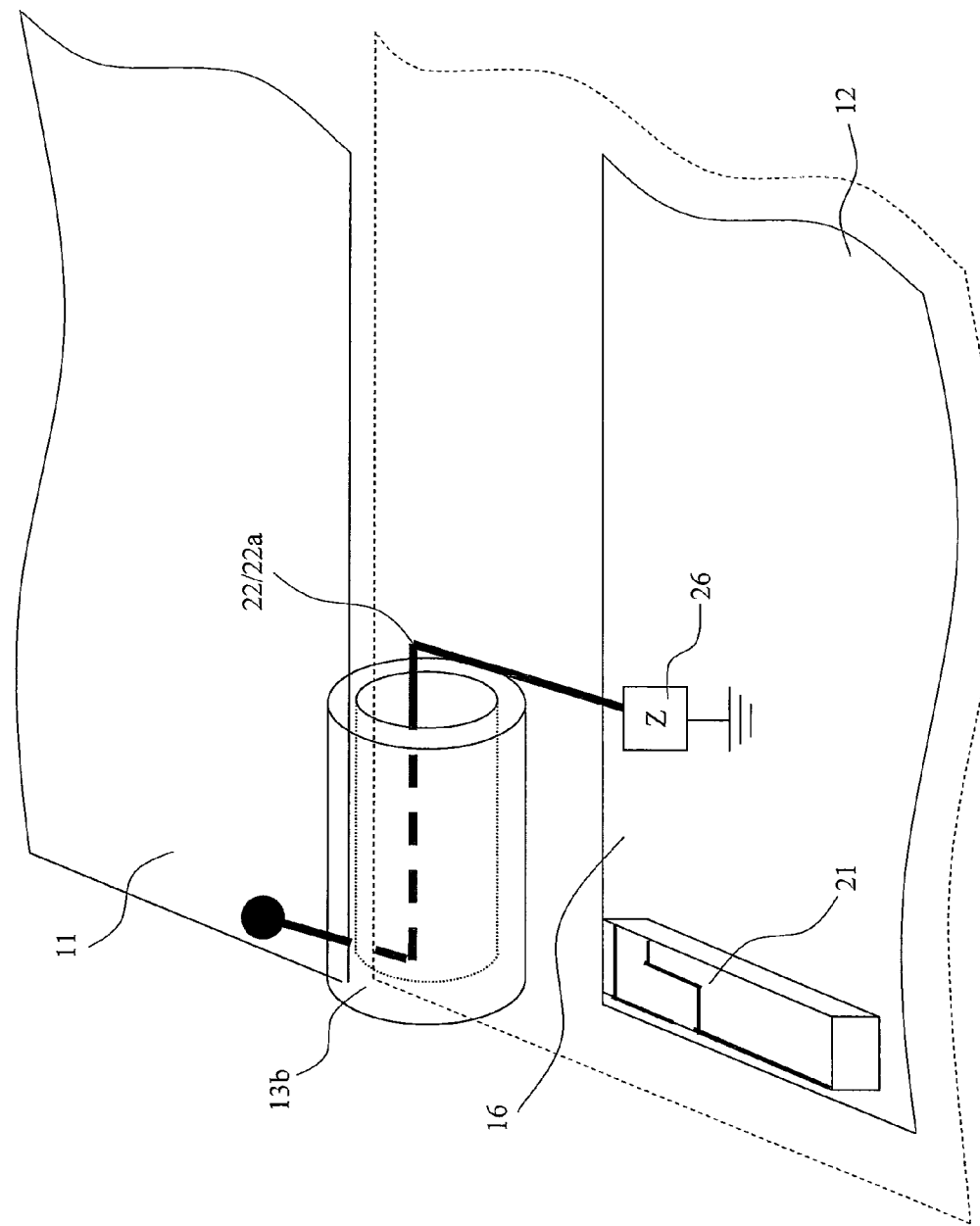
FIG. 6 is a view showing a configuration around the hinge section in FIG. 5.

FIG. 6 is a view showing a configuration around the hinge section 13*b* in FIG. 5. The flexible ground conductor 22 (along with which the flexible cable 22*a* is also provided as described above) is directly connected to the ground at the side of the first housing 11, and is made to pass through the inside of the hinge section 13*b* so as to be connected to the ground section of the circuit board 16 via an impedance variable section 26 configured by an impedance element. It is preferred that the impedance variable section 26 is configured such that the impedance thereof can be changed by impedance adjustment means, such as a filter, not only in the frequency band used by the first and second antennas but also in the frequency band used in the cellular frequency band.

Also in this case, the second antenna element, and the current component which flows on the ground surface of the circuit board 16 in the X-axis direction of the ground surface, act as a dipole antenna, and hence the directivity of the second antenna becomes an 8-shaped directivity in which the X-axis direction is set to null with respect to the XY plane. As a result, the directivity and polarization of the first antenna are respectively orthogonal to the directivity and polarization of the second antenna, so as to make it possible to obtain the same effect as in the case of the first embodiment, and also to make it possible to obtain excellent characteristics with respect to the cellular antenna 21. That is, the antenna characteristics of the cellular antenna 21 can be adjusted by adjusting the impedance variable section 26 to the frequency band used by the cellular antenna 21.

Further, the feeding points of the DTV antenna and the cellular antenna are separated in distance from each other, and hence there is little interference between the antennas.

Third Embodiment

Figure 7:
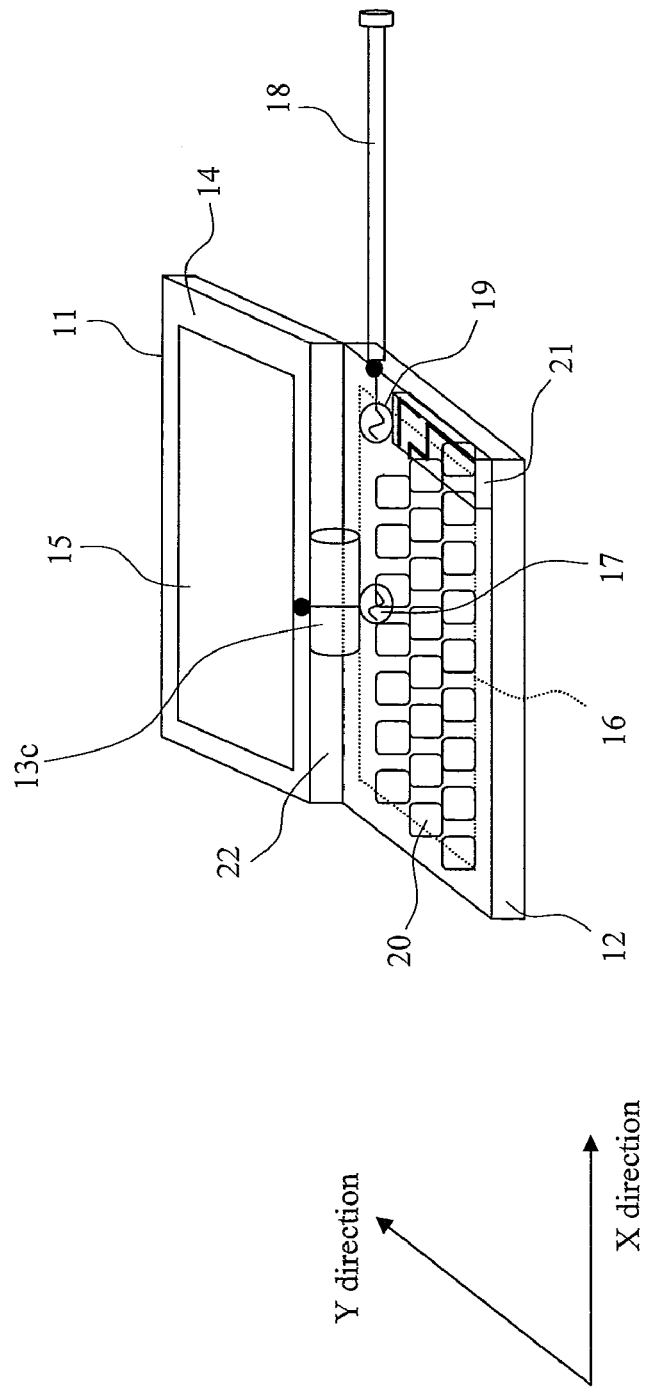
FIG. 7 is a view showing a schematic configuration example of a portable telephone according to a third embodiment of the present invention.

FIG. 7 is a view showing a schematic configuration example of a portable telephone according to a third embodiment of the present invention. Note that also in FIG. 7, portions identical with those in FIG. 2 referred to and described in the first embodiment are denoted by the same reference numerals and characters, and the explanation of the portions is omitted.

In FIG. 7, the first feeding section 17 is arranged near the center of the second housing 12 in the X-axis direction thereof. Also in this case, since the metal frame 14, and the current component which flows on the ground surface of the circuit board 16 in the Y-axis direction of the ground surface, act as a dipole antenna, the directivity of the first antenna 21 becomes an 8-shaped directivity in which the Y-axis direction is set to null with respect to the XY plane. As a result, the directivity and polarization of the second antenna 18 are respectively orthogonal to the directivity and polarization of the first antenna, so as to make it possible to obtain the same effect.

Fourth Embodiment

Figure 8:
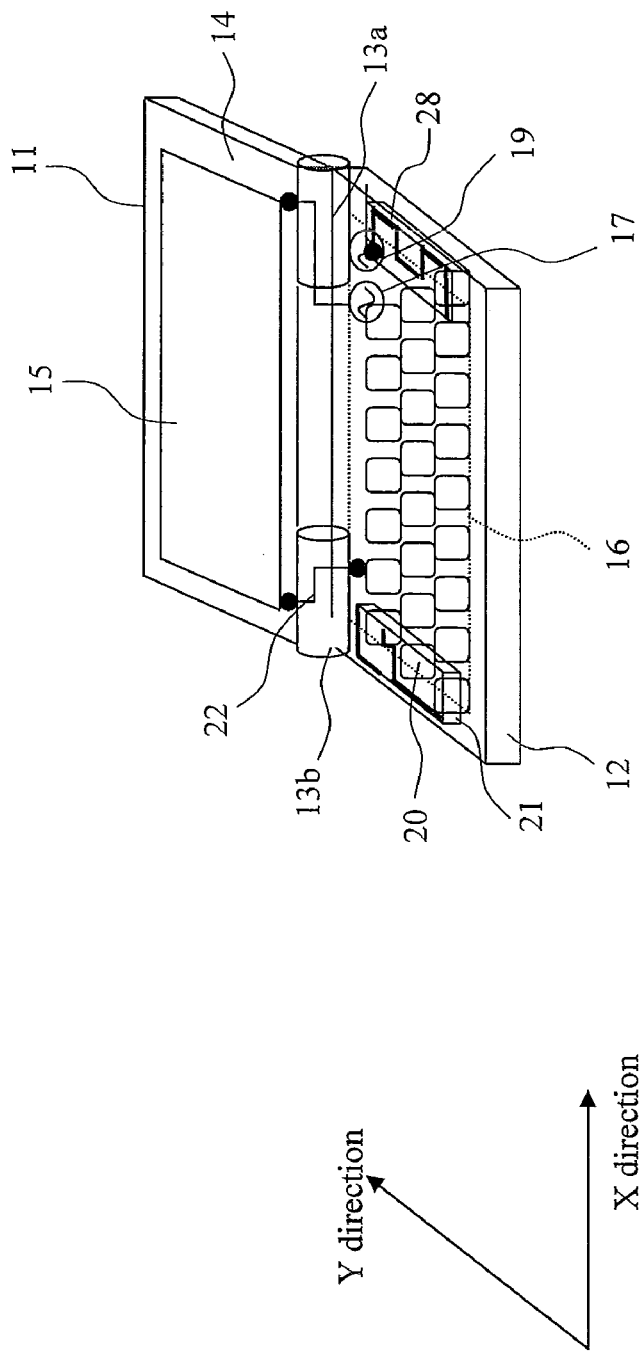
FIG. 8 is a view showing a schematic configuration example of a portable telephone according to a fourth embodiment of the present invention.

FIG. 8 is a view showing a schematic configuration example of a portable telephone according to a fourth embodiment of the present invention. Note that also in FIG. 8, portions identical with those in FIG. 2 referred to and described in the first embodiment are denoted by the same reference numerals and characters, and the explanation of the portions is omitted.

In FIG. 8, the second feeding section 19 is connected to a second antenna element 28. Here, the second antenna element 28 includes a conductor formed by a sheet metal, plating, or the like, and is incorporated in the second housing 12. Also in this case, the second antenna element 28, and the current component which flows on the ground surface of the circuit board 16 in the Y-axis direction of the ground surface, act as a dipole antenna, and thereby the directivity of the second antenna becomes an 8-shaped directivity in which the Y-axis direction is set to null with respect to the XY plane. Thus, the directivity and polarization of the second antenna are orthogonal to each other, so as to make it possible to obtain the same effect.

In the fourth embodiment, electric power is supplied to the second (built-in) antenna element 28 and the metal frame 14 at the same end side in the long-side direction of the housing, but electric power may be supplied to the second antenna element 28 at the opposite side end.

SUMMARY

As described above, the radio apparatus according to each of the embodiments of the present invention is configured such that in the state where the first housing and the second housing are opened, the directivities of the two antennas are orthogonal to each other on the surface formed by the housings. Therefore, a substantially non-directional antenna characteristic can be obtained in the horizontal plane at the time of browsing at the terminal when the XY plane of the radio apparatus is set substantially in parallel with the horizontal ground surface.

Note that the present embodiments have been described by using a portable telephone as an example, but it goes without saying that the present invention can be applied to electronic apparatuses, such as a personal computer, a PDA, and a PHS, each of which uses two antennas. Further, the above described embodiments are not limited to the configurations, and the like, shown in the accompanying drawings, but may be suitably changed within a range capable of exhibiting the effect of the present invention. In addition, the present invention can be practiced with proper modification without departing from the objects and the scope of the present invention.

Further, the processing of each section may be performed in such a manner that a program for realizing the functions described in the present embodiments is recorded in a computer readable recording medium, and that the program recorded in the recording medium is read and executed by a computer system. Note that the "computer system" here is assumed to include an OS and hardware, such as peripheral apparatuses.

Further, the "computer system" is assumed to include a homepage providing environment (or display environment) in the case where the WWW system is used.

Further, the "computer readable recording medium" means portable media, such as a flexible disk, a magneto-optical disk, a ROM, and a CD-ROM, and also means a storage apparatus, such as a hard disk incorporated in the computer system. Further, the "computer readable recording medium" is assumed to include a medium, such as a communication line, which in the case where a program is transmitted via a network, such as the Internet, or via a communication channel such as a telephone line, dynamically holds the program in a short period of time, and also to include a medium, such as a volatile memory in the computer system serving as a server or a client, which medium holds the program for a fixed period of time in such case where the program is transmitted. Further, the above described program may be configured to realize a part of the above described functions, and further may also be configured to realize the above described functions in combination with a program already recorded in the computer system.

INDUSTRIAL APPLICABILITY

The present invention can be used as a radio apparatus.

The invention claimed is:
1. A radio apparatus comprising:
a first housing;
a first antenna element which includes a conductive frame forming the first housing;
a second housing;
a second antenna element which is provided at the second housing;
a connecting section which connects a long side of the first housing and a long side of the second housing to each other;
a ground pattern of the second housing which ground pattern is connected to the first antenna element via the connecting section;
a circuit board which is provided in the second housing and which has a ground pattern;
a radio circuit which is provided in the circuit board;
a first feeding section which is connected to the radio circuit and which supplies electric power to the first antenna element via the connecting section; and
a second feeding section which is connected to the radio circuit and which supplies electric power to the second antenna element,
wherein the long-side direction length of the first housing and the second housing is about $\lambda/4$ or shorter than $\lambda/4$ of the use frequency of the first antenna and the second antenna,
wherein the second antenna element is provided at a long-side direction end section of the second housing, and
wherein the first antenna element and the second antenna element are operated in the same frequency band.

2. The radio apparatus according to claim 1, wherein one of the first antenna element and the second antenna element, and the ground pattern on the circuit board can be operated as a dipole antenna.

3. The radio apparatus according to claim 2, wherein the second antenna element can be extended in the direction substantially in parallel with the extending direction of the connecting section.

4. The radio apparatus according to claim 2, wherein the first feeding section and the second feeding section are arranged at the same end side in the second housing in the extending direction of the connecting section.

5. The radio apparatus according to claim 2, wherein the first feeding section is arranged near the center in the second housing in the extending direction of the connecting section.

6. The radio apparatus according to claim 2, wherein the first antenna element is supplied with electric power by being DC connected to the first feeding section.

7. The radio apparatus according to claim 2, wherein the first antenna element is connected to the first feeding section via capacitance.

8. The radio apparatus according to claim 1, wherein the second antenna element can be extended in the direction substantially in parallel with the extending direction of the connecting section.

9. The radio apparatus according to claim 8, wherein the first feeding section and the second feeding section are arranged at the same end side in the second housing in the extending direction of the connecting section.

10. The radio apparatus according to claim 8, wherein the first feeding section is arranged near the center in the second housing in the extending direction of the connecting section.

11. The radio apparatus according to claim 8, wherein the first antenna element is supplied with electric power by being DC connected to the first feeding section.

12. The radio apparatus according to claim 1, wherein the first feeding section and the second feeding section are arranged at the same end side in the second housing in the extending direction of the connecting section.

13. The radio apparatus according to claim 12, wherein the first antenna element is supplied with electric power by being DC connected to the first feeding section.

14. The radio apparatus according to claim 1, wherein the first feeding section is arranged near the center in the second housing in the extending direction of the connecting section.

15. The radio apparatus according to claim 14, wherein the first antenna element is supplied with electric power by being DC connected to the first feeding section.

16. The radio apparatus according to claim 1, wherein the first antenna element is supplied with electric power by being DC connected to the first feeding section.

17. The radio apparatus according to claim 1, wherein the first antenna element is connected to the first feeding section via capacitance.

18. The radio apparatus according to claim 1, further comprising a switch which switches the connecting destination of the radio circuit between the first antenna element and the second antenna element.

19. The radio apparatus according to claim 1, wherein the first antenna element and the second antenna element are used as diversity antennas.

20. The radio apparatus according to claim 1, wherein the first antenna element is a conductive frame which configures a part of one of the first housing and the second housing.

* * * * *